Patented Mar. 13, 1951

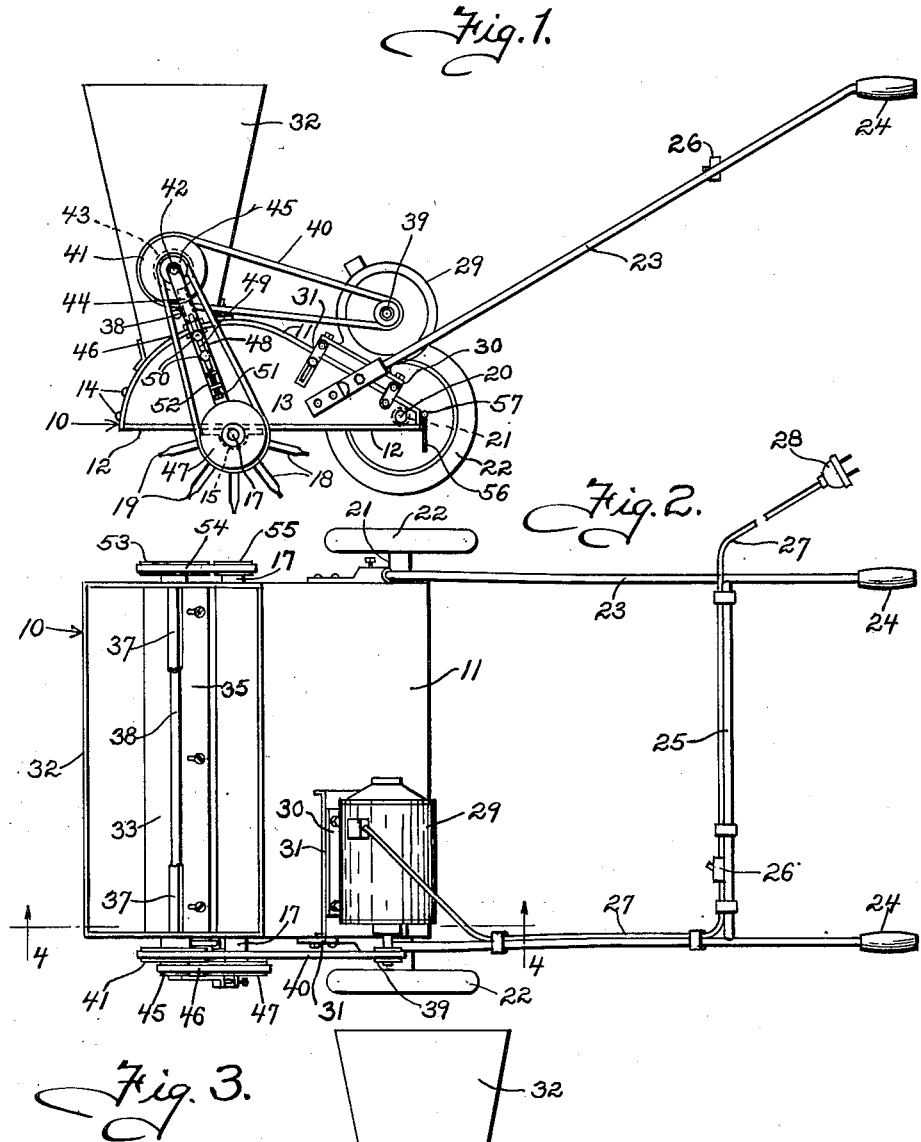
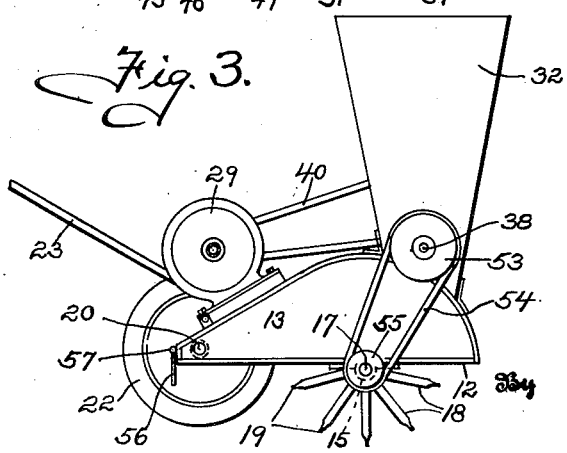

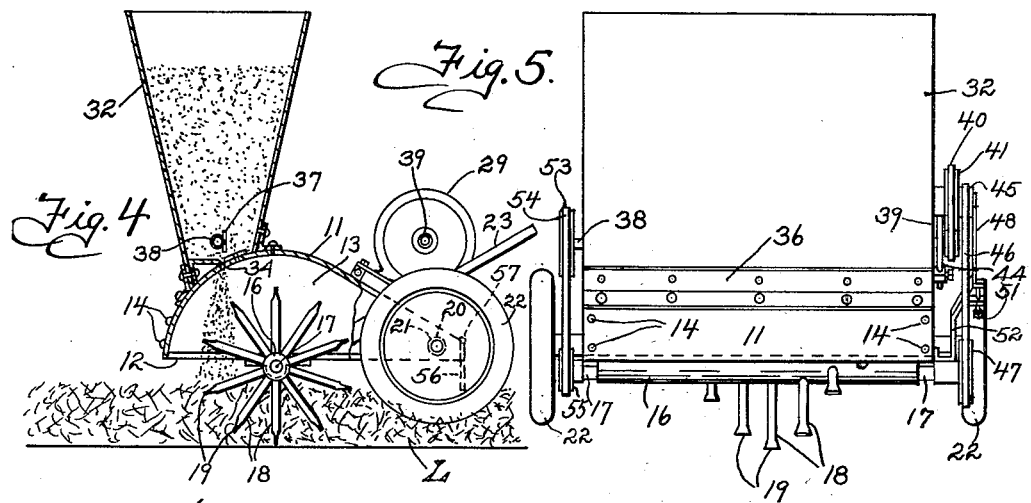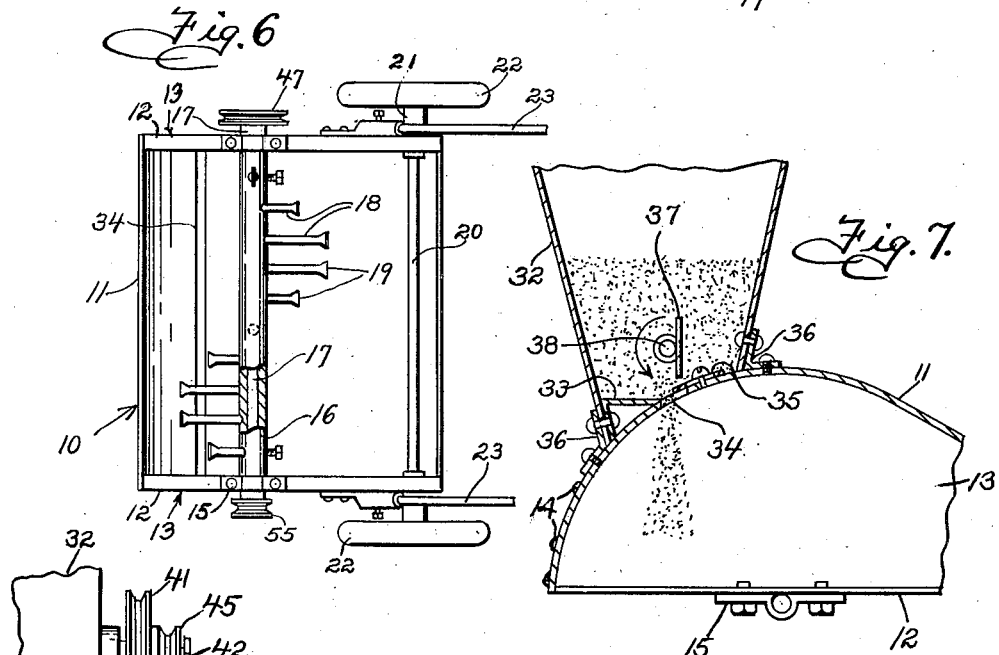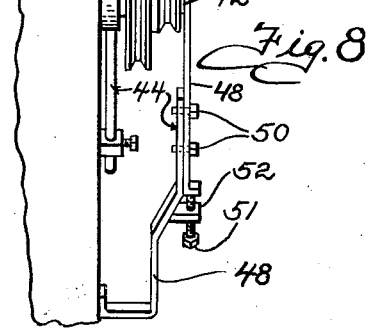

2,545,059

UNITED STATES PATENT OFFICE 2,545,059

LITTER CONDITIONER AND SCRATCH FEED OR LIME DISTRIBUTOR

Arthur B. Ward, Gill, Mass.

Application June 3, 1948, Serial No. 30,823

3 Claims. (Cl. 111—1)

My invention relates to a litter conditioner and scratch feed or lime distributor designed to break and stir up the litter in a poultry house or on the ground or soil in a poultry yard or pen, so as to maintain the litter or soil in a dry, soft, comminuted condition instead of permitting the same to become hard and packed, especially in a poultry house during the winter months, thereby relieving the keeper of the necessity of doing this time-consuming job by hand tool and saving the expenditure of time and energy required in manually accomplishing the conditioning of the litter or soil in addition to the laborious task of numerous other routine chores, plus grading, packing and shipping eggs for hatching or consumption.

One of the important factors in maintaining a dry floor in the poultry house during the winter months is to keep the litter from becoming hard packed. To turn the litter poultrymen have to use a fork and spend much time at this hard and disagreeable hand labor. The work is time-consuming to the extent that many poultrymen just do not get it done and as one result, dry litter is rare in many poultry houses, especially during the winter.

With large numbers of chickens or other poultry such as over 2,000 layers to care for with all the necessary routine chores plus grading, packing, and shipping of hatching eggs, the present invention provides an easier way to break up litter in the laying pens.

A three-fourths horsepower electric motor mounted on a frame drives by means of big belts a shaft on which are mounted ten 5-inch teeth. Aluminum construction keeps the weight at a minimum. The rotating teeth dig into the litter, stirring it up in a swath about 18 inches wide. A metal shield keeps the whirling litter in place. By raising or lowering the handles on the machine, the operator has complete control of the depth to which the teeth penetrate. The machine weighs only 95 pounds and makes very little noise when in operation. While running it is so quiet that the hens nearby pay no attention to it. No doubt they will respond by higher production.

The present invention provides a portable wheeled machine having a motor driven toothed or bladed shaft or cylinder for digging and stirring the litter or soil, enclosed in a casing or housing so as to dig, cut and stir up the litter or soil in a poultry house or yard, the machine having a hopper for containing scratch feed or lime in which an agitator driven from the motor operates to feed the scratch feed or lime and distribute the same over and into the digger and stirrer to uniformly and evenly work the same into the conditioned litter or soil on the floor of the poultry house or ground and the hopper having an adjustable slide controlled outlet to regulate the quantity discharged, so that as the machine is advanced, the conditioner teeth or blades will serve to dig, cut up and stir the litter or dirt in a swath of substantial width depending on the size of the machine, and a shield being provided on the back of the housing or casing to keep the whirling litter in place and from being thrown or scattered about without excessive noise or interference with the poultry continuing to scratch and maintaining the litter and poultry in a sanitary condition.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a side elevation of a litter conditioner and scratch feed or lime distributor embodying my invention.

Figure 2 is a top plan view.

Figure 3 is a side elevation, looking at the side opposite that shown in Figure 1.

Figure 4 is a fragmentary vertical section taken on the line 4—4 of Figure 2.

Figure 5 is a front elevation.

Figure 6 is a bottom plan of the structure shown in Figure 4.

Figure 7 is an enlarged fragmentary vertical section longitudinally of the casing and hopper, showing the adjustable discharge opening and agitator in the hopper correlated to said opening to regulate the discharge of the scratch feed or lime therefrom to be scattered about.

Figure 8 is a detailed end view of an adjustable pulley shaft bearing and belt tightener.

Referring to the drawings in detail, the device comprises a wheeled frame 10 having a substantially semi-oval casing or housing 11 open at the bottom and around the interior of which reinforcing frame bars 12 are provided while the top thereof is convexed upwardly at the front and inclines rearwardly toward the back. This casing may be formed of end plates 13 to which the top of the casing may be secured as at 14, the top being in the form of a metal or other sheet.

Journalled in bearings 15 at the bottom edges of the bars 12 of the frame and casing is a shaft or cylinder 16 having reduced end spindles 17 rotatable in the bearings. The shaft or cylinder 16 carries a plurality of radially extending spirally arranged blades or teeth 18 having pointed ends 19 designed to dig into the litter or soil L in a poultry house, yard or pen to break and stir up the litter or soil to maintain the same in a dry, soft and comminuted condition instead of permitting the same to become hard and packed, especially in a poultry house during the winter months. It is necessary to turn the litter for this purpose and poultrymen generally have used a spading fork or other tool for this purpose in order to keep the soil from becoming wet and packed hard. The present invention is designed to relieve this manual labor by a motor driven digging and stirring device. Preferably, the teeth or blades 18 are 5 inches long and about 10 in number but it is not desired to be limited to any particular size or number and it may also be mentioned that some light metal such as aluminum is used in the construction to keep the weight of the machine at a minimum.

In order to render the machine or device portable, the frame and casing are supported on an axle 20 across the rear part of the casing and may be fixed or rotatable in bearings 21 at the side bars 12 of the frame to journal ground wheels 22 by which the casing is supported at an elevation from the ground or litter supporting surface with the radial teeth or blades 18 projecting downwardly slightly below the wheels. The machine is designed to be advanced in any suitable way and for this purpose is shown provided with handle bars 23 secured to the sides or ends of the casing and frame and extending upwardly in inclined positions with hand grips 24 on the horizontal rear end portions thereof. A brace 25 may connect the handle bars 23 to strengthen the same and also to support a switch 26 interposed in an electrical circuit including extension cables 27 having a plug 28 adapted to be inserted in a wall socket of a building, the cables extending from the switch to an electric motor 29 having its base 30 bolted on a bracket 31 for adjustment to the top of the frame and casing at the rearwardly inclined portion.

Arranged upon the forward convex portion of the casing or housing 11 is a hopper 32 having a shelf 33 at the front and a discharge slot 34 through the top of the casing forming the bottom of the hopper over which an adjustable slide 35 is arranged to regulate the size of the discharge slot which, as shown, extends transversely across the width of the hopper and casing. The hopper may be secured in position as by means of brackets 36 attaching the same to the casing as particularly shown in Figures 1, 4 and 7 of the drawings and is adapted to contain scratch feed, lime or the like to be discharged through the litter or soil when the machine is operated. Also, a rotatable agitator blade 37 is fixed to a shaft 38 transversely through the sides or ends of the hopper in spaced relation to and slightly above the discharge slot 34, to loosen the contents of the hopper so as to cause the discharge thereof through the slot 34.

In order to drive the toothed wheel, cylinder or shaft which serves to advance the machine in connection with manual action upon the handle bars, the motor shaft at its rotor is provided with a small pulley 39 around which an endless drive member or belt 40 is trained in connection with a larger pulley 41 fixed to an idler shaft 42 journalled in an adjustable bearing 43 carried by a bracket 44 secured to the same end of the hopper and casing at which the rotor shaft 39 of the motor 29 is disposed or projects. A smaller pulley 45 is also fixed to the shaft 42 and has an endless drive member or belt 46 trained thereon and around a larger pulley 47 fixed to the corresponding end of the cylinder or shaft 16 of the bladed wheel. Thus, the motor 29 may be controlled to operate or stop by the switch 26, to drive the toothed or bladed shaft, cylinder or wheel. Adjustment of the position of the motor will tend to tighten the belt 40 and this may also be accomplished by adjusting the bearing 43 on the bracket 44, which latter also serves to tighten the belt 46. As shown, the bearing bracket is adjustable through the medium of a radial arm 48 having slots 49 through which clamping screws 50 are engaged in the bracket or ends of the casing or housing 11 and capable of being moved in or out by an adjustment screw 51 threaded through a lug 52 carried by the bracket or end wall of the casing, thereby maintaining the belts taut and the drive connection or gear at its highest efficiency.

At the opposite end of the shaft 38, a pulley 53 is fixed and bears an endless drive member or belt 54 which is also trained around a pulley 55 fixed to the adjacent end of the shaft spindle 17 in order to rotate the agitator blade 37 simultaneously with the rotation of the bladed or toothed wheel, which as it rotates in an anti-clockwise direction, as seen in Figures 1 and 4, will dig into the litter or earth and serve to advance the machine, in addition to cutting and stirring up the litter so as to break it up into finely comminuted particles which will remain somewhat loose and fluffy instead of being packed hard to remain wet due to the absorption of moisture, especially in poultry houses during the winter months, thereby maintaining the litter in a loose, dry and comminuted and sanitary condition because of its aeration by exposure of the particles thereof to heat and air within the poultry house. Also, in the operation of the device, it will be observed that as the bladed or toothed wheel rotates to impel the machine, the agitator blade 37 is driven to loosen the scratch feed, lime or other contents of the hopper 32 and force the same through the discharge slot 34 regulated as to size by the slide 35 in the manner previously described. This will cause the scratch feed or lime to be discharged in a stream across the top of the housing or casing 11 into the toothed or bladed wheel, to be scattered thereby and worked into the litter so that in addition to keeping the litter in a dry and loose condition, the poultry are caused to scratch and exercise so that they are maintained in a healthy condition which enhances their laying abilities. Thus, it will be seen that instead of manually turning the litter by means of a spading fork or the like, the device need merely be advanced across the litter on the floor of the poultry house or soil in a poultry yard or pen and said litter or soil is stirred up in a swath of 18 inches or other width, depending upon the size of the machine, so as to keep the same in a loose, dry condition. While not limited to any particular size of parts, the electric motor may be a three-fourths horsepower motor mounted on the frame and casing as described to drive the belts and toothed wheel and agitator therefrom and with the parts constructed of aluminum or other light metal, the weight is kept at a minimum.

The rotating teeth dig into the litter, breaking and stirring it up to prevent it from becoming packed hard. By raising or lowering the handles on the machine, the operator has complete control of the depth to which the teeth penetrate. The machine may weigh only 95 pounds and makes very little noise when in operation and by reason of running quietly, the poultry, such as chickens, need pay no attention to it and, therefore, it does not interfere with their exercise and their high production.

The rear of the casing or housing 11 is provided with a fender or shield 56 at the back, hinged at the top as at 57 if desired, to keep the whirling and spread litter or earth in place beneath the housing or casing 11 from being thrown out or scattered about. In regulating the depth at which the teeth 18 penetrate the litter or dirt, the axle or shaft 20 at wheels 22 on which the machine is supported serves as a pivot axis on which the frame 10 and casing 11 and all parts carried thereby, swing or tilt up and down together with the toothed or bladed shaft, cylinder or wheel 16 to raise or lower the latter by pressure on handles 24 or release thereof.

I claim:

1. A litter conditioner and scratch feed or lime distributor comprising a rectangular frame, a downwardly opening housing disposed over said frame, a hopper mounted on said housing at the front portion thereof, a discharge slot opening through the bottom of said hopper and through said housing, an agitator member journalled in said hopper above said discharge slot, a toothed shaft rotatably carried by said frame below said housing, ground engaging wheels journalled in said housing adjacent the rear end thereof, a motor mounted on said housing rearwardly from said hopper, a pulley on said motor, a telescoping bracket secured at one end to the side of said housing, extending forwardly and upwardly and secured at the other end to said hopper, a bearing carried by said bracket for adjustment relative to said motor pulley and said toothed shaft, an idler shaft journalled in said bearing, flexible driving connections between said motor pulley and said idler shaft and between said idler shaft and said toothed shaft, a pulley on said agitator member, a second pulley on said toothed shaft and an endless belt connector between said pulleys for driving the agitator to discharge the scratch feed or lime contained in said hopper through said discharge slot, handles extending from said frame for guiding said frame and for tilting said frame about said ground engaging wheels whereby said toothed shaft may be raised or lowered to regulate the depth of penetration into the litter, and a switch for controlling said motor.

2. A litter conditioner and scratch feed or lime distributor comprising a rectangular frame, a housing over the frame and open at the bottom, a hopper on the housing at the front portion and having a discharge slot through the housing, a plate for adjusting said discharge slot, an agitator within the hopper over the slot, a toothed ground stirring device journalled beneath the housing, ground wheels journalled near the bottom of the housing at the rear thereof, a motor on the housing in rear of the hopper and a driving pulley for said motor, an idler shaft journalled on the housing, a movable bracket for adjusting said idler shaft toward and away from said ground stirring device and said motor driving pulley, a pulley upon one end of said stirring device, a pulley on said shaft, a driving belt around said pulley on said stirring device and said motor driving pulley adapted to be tightened by adjustment of said idler shaft to drive the toothed shaft in a direction to advance the machine over the litter or soil, a pulley upon said agitator, a pulley on the other end of said stirring device, an endless belt connecting said last mentioned two pulleys to rotate the agitator in the hopper, handle bars attached to the frame and extending rearwardly and upwardly therefrom, and a switch for controlling the operation of the motor.

3. A litter conditioner and scratch feed or lime distributor comprising a rectangular frame, a housing over the frame and open at the bottom, a hopper on the housing at the front portion thereof and having a discharge slot opening through the housing for discharging the scratch feed or lime therethrough, a movable slide for adjusting said discharge slot, an agitator within the hopper over the slot, a toothed shaft journalled beneath the housing, ground wheels journalled near the bottom of the housing at the rear thereof, a motor on the housing in rear of the hopper, a bearing, a bracket secured at an end to said hopper adjustably mounting said bearing relative to said housing, an idler shaft journalled in said bearing, a belt and pulley connection for driving said idler shaft from said motor, a second belt and pulley connection for driving said toothed shaft from said idler shaft in a direction to move the teeth rearwardly at the bottom in the litter to propel the machine forwardly, a belt and pulley connection between said toothed shaft and said agitator, for driving said agitator from the toothed shaft to discharge the scratch feed or lime through said slot and into the toothed shaft at the front, operating handles for guiding the machine and tilting the frame on the journals of the wheels to raise or lower the toothed shaft and regulate the depth at which the teeth penetrate the litter, and a switch for controlling the starting and stopping of the motor.

ARTHUR B. WARD.

REFERENCES CITED

The following references are of record in the file of this patent:

UNITED STATES PATENTS

| Number | Name | Date |
| --- | --- | --- |
| 928,452 | Houghland | July 20, 1909 |
| 1,084,908 | Starriett | Jan. 20, 1914 |
| 1,292,391 | Dougherty | Jan. 21, 1919 |
| 1,349,858 | Sherrod | Aug. 17, 1920 |
| 1,965,483 | Woods | July 3, 1934 |
| 2,250,391 | Ober | July 22, 1941 |
| 2,400,204 | Lindskog | May 14, 1946 |

OTHER REFERENCES

Publication: "Electrical World," April 24, 1948, pages 108–109, 119–121.